April 2, 1929. M. D. VIETA 1,707,586
MEASURING INSTRUMENT
Filed Oct. 12, 1927
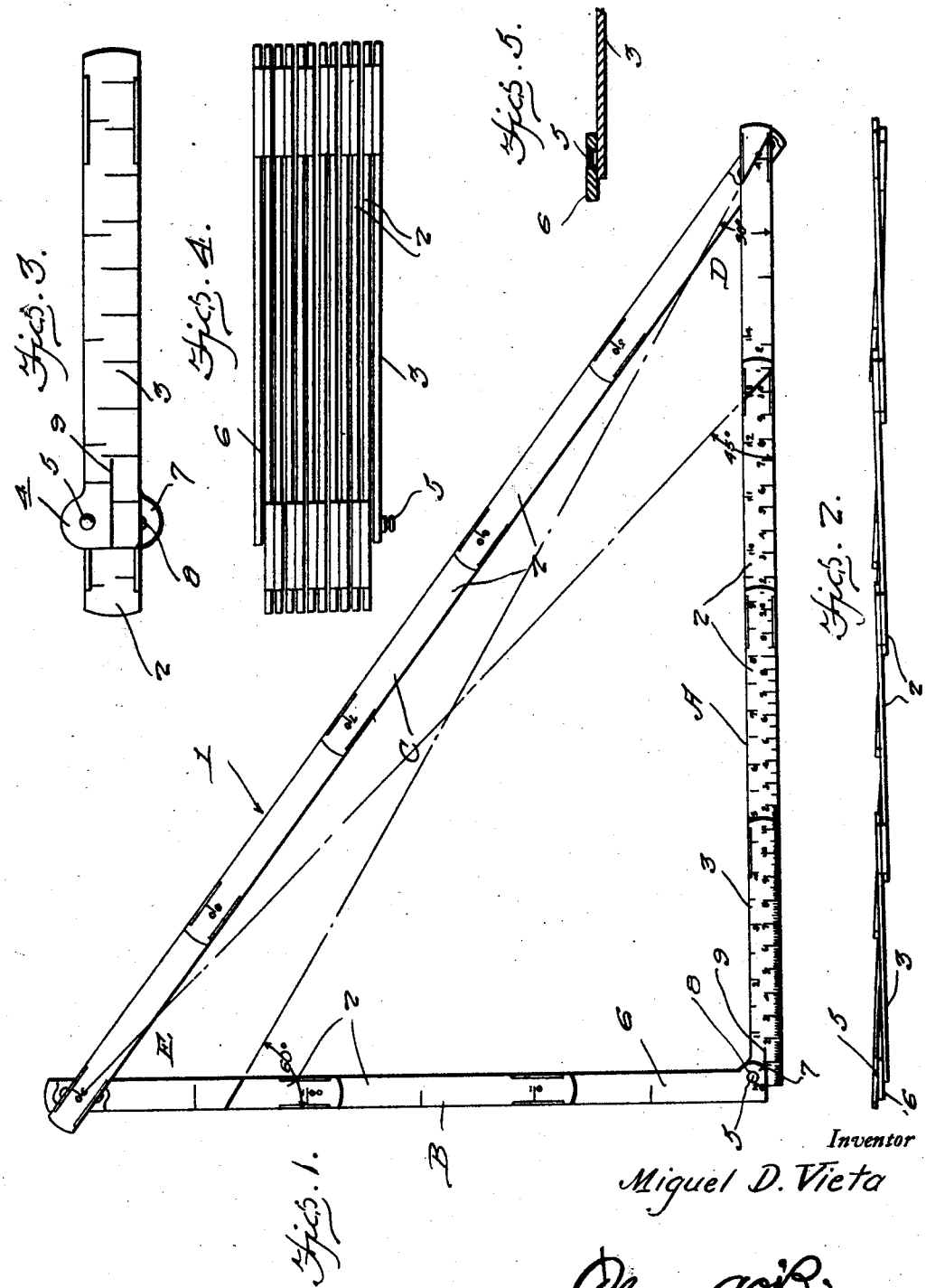
Inventor
Miguel D. Vieta
By Clarence A. O'Brien
Attorney Patented Apr. 2, 1929.

1,707,586

UNITED STATES PATENT OFFICE.

MIGUEL D. VIETA, OF HABANA, CUBA.

MEASURING INSTRUMENT.

Application filed October 12, 1927, Serial No. 225,828, and in Cuba June 13, 1927.

The present invention relates to improvements in measuring instruments and has reference more particularly to an improved folding rule.

One of the important objects of the present invention is to provide a measuring instrument of the above mentioned character which includes a series of hingedly connected sections, the same being adapted for arrangement in various positions whereby to form a straight edge or a triangle.

Another important object of the invention is to provide a measuring instrument of the above mentioned character which facilitates the checking of 30, 45, 60 and 90 degree angles, thus obviating the necessity of having to provide individual triangles of various degrees.

A still further object is to provide a measuring instrument of the above mentioned character which is simple in construction, inexpensive, strong and durable and further well adapted to the purpose for which it is designed.

Other objects and advantages of the invention will become apparent from the following description when taken in connection with the accompanying drawings.

In the accompanying drawing forming part of this application and in which like numerals indicate like parts throughout the same;

Figure 1 is a top plan view of the measuring instrument showing the same in the formation of a right angle triangle.

Figure 2 is an edge elevation thereof.

Figure 3 is a top plan view showing the instrument in its folded condition.

Figure 4 is a side elevation thereof, and

Figure 5 is a fragmentary detail section showing the connection between the free ends of the rule.

In the drawing wherein for the purpose of illustration is shown the preferred embodiment of my invention, the numeral 1 designates generally my improved measuring instrument, the same comprising twelve short sections of the same size from connection to connection, designated by the numeral 2. These sections are pivotally connected together at their adjacent ends in any appropriate manner such as is common in connection with the sections of a folding rule, and as is clearly shown in Figure 2, the pivotally connected ends of the adjacent sections are disposed in overlapping relation. When all of the sections are disposed in an extended straight line, the instrument will measure one meter and twenty centimeters.

Each section will of course be provided with the usual indicia to facilitate the proper use of the instrument.

One end section 3 of the rule is formed with a laterally extending ear 4 and arranged on this ear is the upstanding headed pin 5, the purpose of which will be presently apparent.

The other end section 6 is also formed with a laterally extending ear 7 and this ear is formed with an opening 8 in which the headed pin 5 is adapted to be snapped for connecting the end sections of the rule together in the manner shown in Figures 1 and 5.

A scratch line 9 is arranged on the upper face of the endmost section 3 in such a manner as to permit the end of the other end section 6 to be disposed in the same horizontal plane with said scratch line whereby to indicate that the arm portion B formed by three of the sections of the folding rule is disposed at right angles with respect to the base A. The hypothenuse C cooperates with the opposite ends of the base A and the perpendicular arm B to form a right angle triangle in the proportion of 3, 4 and 5, thus assuring its exactness as it complies with the well known theorem of Pythagoras.

The lines which carry the marks for showing the way of checking angles of 30 and 60 degrees the one E, and the other D, for the same purpose on an angle of 45 degrees, as well as the other one mentioned above which shows the way to form right angle triangle, will have special color, in order to be easily observed from the other lines shown in the instrument.

In this manner the folding rule can be used either as a right angle triangle, or by following the lines described therein for checking angles of 30, 45 or 60 degrees as is desired.

The instrument can furthermore be used as a meter rule when all of the sections are extended and disposed in the same horizontal plane.

When not in use, the headed pin 5 is disengaged from the opening 8 and the sections 2 are folded upon themselves in the manner as shown in Figures 3 and 4 by providing a compact device which can be easily carried or readily stored away without occupying any considerable space.

While I have shown the preferred embodiment of my invention, it is to be understood that various changes in the size, shape and arrangements of parts may be resorted to without departing from the spirit of the invention and the scope of the appended claim.

Having thus described the invention, what I claim as new is:—

In a measuring instrument of the class described, a folding rule including twelve sections of the same size, said sections being hingedly connected together in overlapping relation at their adjacent ends, a laterally extending ear formed on each end section adjacent the free end thereof, one of said ears being formed with a socket, and a headed pin carried by the other ear for engagement with the socket to secure the rule sections in a predetermined triangle forming relation.

In testimony whereof I affix my signature.

MIGUEL D. VIETA.